United States Patent [19]

Zehr

[11] 4,006,780

[45] Feb. 8, 1977

[54] RUPTURING HEAD FOR FIRE EXTINGUISHERS

[75] Inventor: William J. Zehr, Des Plaines, Ill.

[73] Assignee: The Protectoseal Company, Bensenville, Ill.

[22] Filed: May 24, 1976

[21] Appl. No.: 689,098

[52] U.S. Cl. .................................. 169/26; 137/72; 169/74; 169/42

[51] Int. Cl.$^2$ .................. A62C 35/02; F16K 13/04; A62C 37/30

[58] Field of Search ............... 239/309; 169/54, 56, 169/57, 19, 26, 30, 74, 42; 222/5, 54, 83; 137/68 R, 72; 220/89 B

[56] References Cited

UNITED STATES PATENTS 3,613,793 10/1971 Huthsing, Jr. ...................... 169/26

3,754,602 8/1973 Magdars ......................... 169/26 X

FOREIGN PATENTS OR APPLICATIONS 1,099,903 9/1955 France ............................... 169/26

*Primary Examiner*—Evon C. Blunk
*Assistant Examiner*—Andres Kashnikow
*Attorney, Agent, or Firm*—Rummler & Snow

[57] ABSTRACT

A device for rupturing a pressurized cylinder containing a fire extinguishing product wherein when the temperature is high enough to melt the fusible link, it will cause a spring-loaded punch to forcibly propel the punch downwardly to rupture a rupturable disk in the cylinder to allow the contents to be ejected therefrom.

4 Claims, 5 Drawing Figures

RUPTURING HEAD FOR FIRE EXTINGUISHERS

BACKGROUND OF THE INVENTION

The art is replete with devices employing a fusible link which melts at 160° F. to release fire extinguishing gas from containers, such as U.S. Pat. Nos. to:

- Mossberg, 2,115,371;
- Axtell, 2,208,490;
- Bakos, 3,216,506;
- Macartney, 3,348,617;
- Huthsing, 3,613,793;
- De Ronville, 3,638,733;
- Williams, 3,884,306.

However, none of these patents disclose the novel features of the instant invention.

SUMMARY OF THE INVENTION

The present invention provides a hollow housing, removably secured to a container having fire extinguishing material therein, said container provided with a neck having a rupturable disk therein, said housing having a cylindrically shaped upper half provided with apertures and an integrally formed square in cross-section lower half, housing an axially positioned punch having a spring loaded seat portion and an offset tubular portion integrally formed on the lower end of the seat and having its free end sharpened, the area between the lower end of the upper half and the upper end of the tubular portion connected by a taper extending downwardly and inwardly. The punch is positioned and held in inoperative position by a pair of rotary pivoted arms held parallelly by a fusible link one on each side of said lower half of said housing, and means for securing the housing to a cylinder loaded with a fire extinguishing material under high pressure having a rupturable disk in its outlet end whereby when the link melts, the spring will cause the arms to be shifted laterally and the seat and tube to be forcibly projected downwardly to rupture the disk and allow the contents of the cylinder to flow upwardly through the punch and outwardly to the atmosphere through the apertures in the housing to extinguish the fire.

DETAILED DESCRIPTION OF THE DRAWINGS

Figure 1:
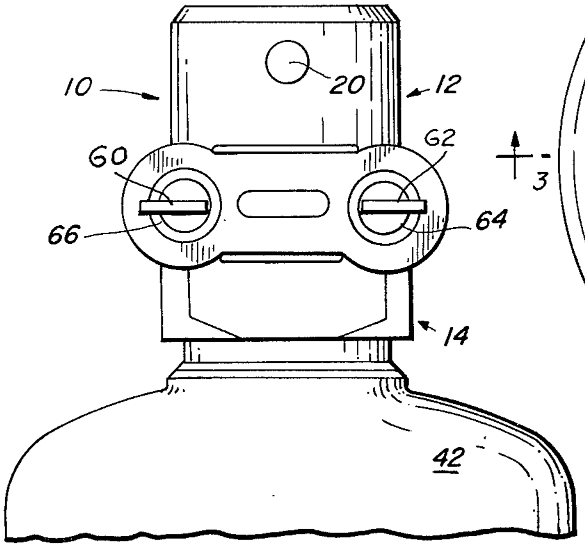
FIG. 1 is a side elevational view of the present invention attached to a fire extinguisher cylinder.

The housing 10 comprises a cylindrical hollow upper portion 12 and a square in cross-section lower portion 14, which is provided with an axial cylindrical bore. The portion 12 has a side wall 16 and a top wall 18. Four apertures 20 are positioned equi-distantly in the wall 16 adjacent the top wall, the purpose of which will hereinafter be described.

The cylindrical punch 22 comprises a hollow seat 24 having a side wall 26 and a tapered lower portion 28 to seat the lower end of the spring 30. The upper end of the spring bears against the lower surface of the top wall 18 of housing 10. The lower outer side wall 26 is tapered downwardly and inwardly as at 29.

Figure 3:
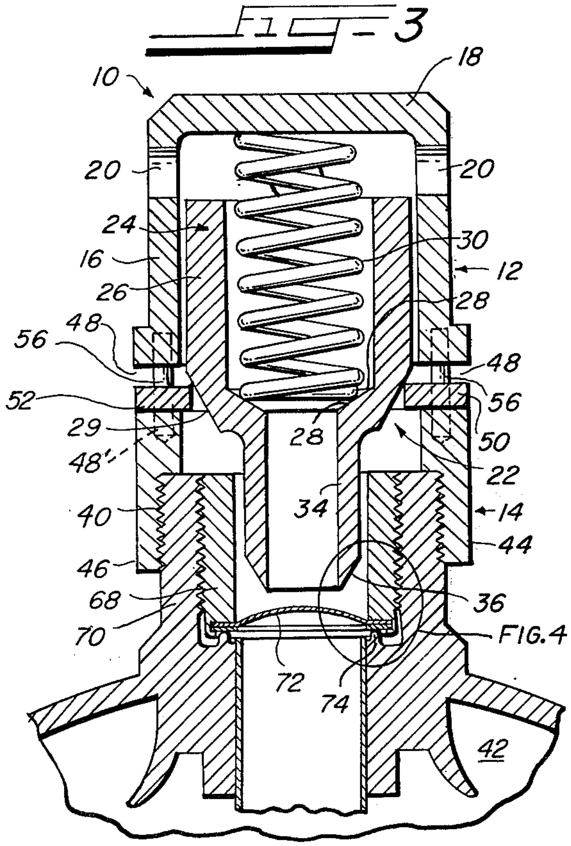
FIG. 3 is a vertical cross-sectional view taken on the line 3—3 of FIG. 2.
Figure 5:
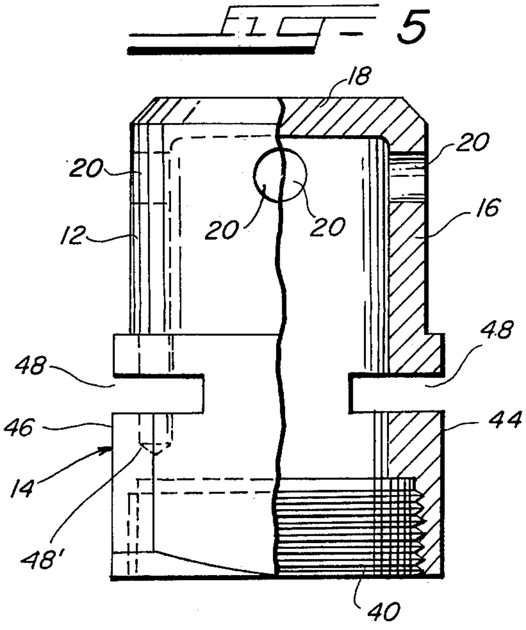
FIG. 5 is a partial front elevational view of the housing and partially in cross-section.

As clearly shown in FIG. 3, the wall 26 has a diameter smaller than the inner surface of the side wall 16 for easy shifting of the seat.

Integrally formed on the seat 24 and depending from the terminal end of tapers 28 and 29 is an offset cylindrical hollow elongated tube 34, the free end of which is tapered to form a cutting edge 36. It is to be noted that the diameter of tube 34 is about one-half the diameter of the seat 24.

The lower portion 14 depends from and is integrally formed on the upper portion 12 and is also hollow and provided at its lower end with interior threads 40 for attachment to the neck of the cylinder 42 containing the fire extinguishing material.

Figure 2:
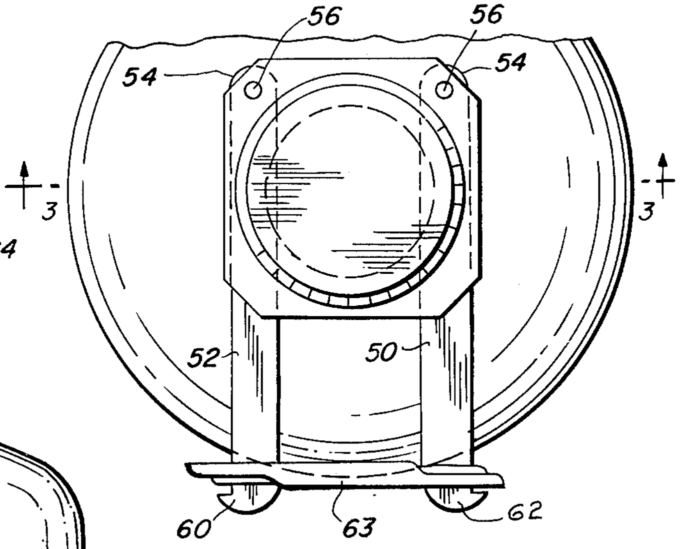
FIG. 2 is a top elevational view of FIG. 1 with parts broken away.
Figure 4:
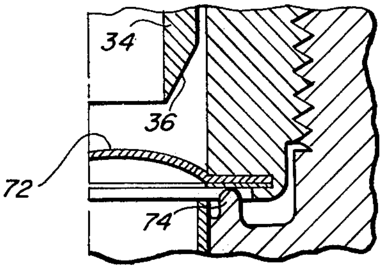
FIG. 4 is an enlarged cross-sectional view of the details of one side of the rupturable disk in association with the lower end of the housing and punch.

The side walls 44, 46 are each provided with a slot 48 in which arms 50, 52 respectively, loosely seat. The ends 54 of arms 50, 52 are loosely pivoted to roll pins 56 seated in appropriate aligned bores in the lower portion 14, as shown in FIGS. 2 and 3, with the lower ends of the pins 56 pressfitted in the lower apertures 48′ so as to anchor the pins 56 and prevent accidental withdrawal thereof.

The free or opposite ends of arms 50, 52 are each provided with a hook 60, 62 to receive the usual fusible link 63 by insertion in apertures 66, 64, respectively, and thus retain the arms in parallellism, and positioning the punch in the position shown in FIG. 3. As shown, the arms 50–52 are seated against the tapered wall 29.

A threaded hollow nut 68 is fitted to the neck 70 of the cylinder 42 to position and hold a rupturable disk 72 in position on its seat 74 and prevent any emission of the contents from the container. It is to be noted that the outside diameter of the tube is smaller than the diameter of the inside wall of the lower portion 14 and interior of the hollow area of the nut 68 for ready shifting of the punch axially therein.

The fusible link 63 melts when the temperature reaches 160° F. When this occurs, the punch will be urged downwardly under the action of the spring 30. The tapered wall 29 will thus force the arms 50, 52 outwardly laterally about the pivot pins 56 and cutting edges 36 will penetrate and rupture the disk 72 to allow the ingredients to flow upwardly through the punch and to the surroundng outside area through apertures 20 to quench any fire.

The fire extinguishing material in the container is preferably bromotrifluoromethane (common name Halon) under great pressure. This chemical has the properties of quickly quenching fires, and particularly chemical fires.

The top wall 18 may also be provided with an aperture if desired for upward discharge of the material.

The device is resetable by employing a tublar tool to move the punch back against the spring force. The tool bears against the shoulder just below the taper 29. When the punch is forced back sufficiently, the arms 50, 52 may be brought back to parallelism enough to place a new fusible link on their hooked ends. When the tool is removed, the tapered portion 29 will force the arms outwardly to put the fusible link under tension and thus place the head in condition for use again on a fresh cylinder of fire extinguishing material.

Although but one specific embodiment of this invention is herein shown and described, it will be understood that details of the construction shown may be altered or omitted without departing from the spirit of the invention as defined by the following claims.

I claim:

1. A head for rupturing a disk in the cylindrical neck of a container for emission of fire extinguishing material, said neck having male threads around the exterior wall of the neck and a rupturable disk in said neck, in combination with a hollow housing having a top and side wall, the upper portion being cylindrical, and having an integrally formed substantially square in cross-section lower portion, said lower portion having a top and side and end walls, the lower end of said lower portion being internally threaded for securement to the neck of the container, said lower portion provided with a pair of opposed slots in said side walls and partially into said end walls, a pair of vertically disposed roll pins anchored to said side walls and each spanning one of said slots, a hollow punch having a cylindrical spring loaded seat positioned interiorally in the upper portion of said housing and a hollow tubular member integrally formed on the lower end of said seat and offset from said seat, the free end of said tubular member being sharpened to form a cutting edge, a pair of arms each positioned in one of said slots, one end of each of said arms pivotally secured to one of said roll pins, a hooked portion on the opposite end of each of said arms and a fusible link secured to said hooked portions to position said arms in parallel and support said seat in inoperative position.

2. The device according to claim 1 wherein the lower end of said seat is tapered downwardly and inwardly and said tubular member depends from the lower portion of said taper and a spring in said seat portion.

3. The device according to claim 2 wherein each of said arms seat on said taper in inoperative condition whereby when said fuse link melts under high temperature, the taper will shift said arms outwardly about said roll pins under pressure of said spring and force said punch downwardly to rupture the disk in said container neck.

4. A fire extinguisher cylinder having a discharge neck with a rupturable disk therein in combination with a discharge and perforator head removably secured thereto which comprises:

a. a hollow housing having a cylindrical upper portion having a side and top wall with apertures in the side wall, and an integrally formed enlarged square in cross-section lower portion having top, side and end walls, a slot in each of said side walls extending the length of said side walls and partially into said end walls and having communication with the interior of said housing;

b. a hollow cylindrical punch positioned axially and loosely seated in said housing comprising an upper seat portion having a side wall, the lower interior and exterior ends of the wall of said upper seat portion being tapered downwardly and inwardly, and terminating in a depending hollow tubular portion integrally formed thereon and extending axially, the free end of said tubular portions tapered inwardly and outwardly to form a cutting edge;

c. a spring positioned in said upper portion of said punch seating between the inner taper of said seat portion and the upper wall of said housing;

d. a pair of arms, one seated in each of said slots, one end of each of said arms pivotally secured to a vertically extending roll pin anchored in the side walls of said lower portion of said housing and spanning said slots, the free ends of said arms each terminating in a hook;

e. a fusible link secured to and extending between each of the hooks in said arms;

f. and means to secure said housing to the neck of said container;

said punch held in inoperative position by a portion of each of said arms bearing against the exterior taper on the lower wall of said seat portion; whereby when the temperature around the cylinder is higher than the melting point of the link, the fusible link will melt, allowing the punch to push aside the retaining arms and proceed downwardly at a high speed to perforate the rupturable disk in the neck of the fire extinguishing cylinder to allow the contents to flow under great pressure upwardly through the punch and outwardly through the apertures in the housing.

* * * * *